(12) United States Patent
Kimura et al.

(10) Patent No.: US 8,559,428 B2
(45) Date of Patent: Oct. 15, 2013

(54) NETWORK SYSTEM

(75) Inventors: Shinya Kimura, Kanagawa (JP);
Takahiro Sasaki, Kanagawa (JP);
Motoki Nakade, Tokyo (JP); Yoshiyuki Kunito, Kanagawa (JP); Akihiro Hokimoto, Saitama (JP); Makoto Oka, Chiba (JP); Shinako Matsuyama, Tokyo (JP); Atsushi Shionozaki, Tokyo (JP)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 12/348,058

(22) Filed: Jan. 2, 2009

(65) Prior Publication Data
US 2009/0116480 A1 May 7, 2009

Related U.S. Application Data

(62) Division of application No. 10/276,627, filed as application No. PCT/JP02/02581 on Mar. 19, 2002.

(30) Foreign Application Priority Data

Mar. 19, 2001 (JP) ................. 2001-078740
Mar. 19, 2001 (JP) ................. 2001-078741
Mar. 19, 2001 (JP) ................. 2001-078742

(51) Int. Cl.
*H04L 12/28* (2006.01)

(52) U.S. Cl.
USPC .......................... 370/392; 370/401

(58) Field of Classification Search
USPC ............... 370/252, 389, 392, 401, 410
See application file for complete search history.

(56) References Cited

U.S. PATENT DOCUMENTS 5,365,451 A  11/1994 Wang et al.
5,623,601 A   4/1997 Vu
5,918,021 A *  6/1999 Aditya ................. 709/235
(Continued)

FOREIGN PATENT DOCUMENTS

JP  10-285658  10/1998
JP  11-331181  11/1999
(Continued)

OTHER PUBLICATIONS

Krishnamurthy P. et al.: "Security architecture for wireless residential networks" IEEE, vol. 4, Sep. 24, 2000 pp. 1960-1966, XP010524364.
(Continued)

*Primary Examiner* — Ricky Ngo
*Assistant Examiner* — Christine Ng
(74) *Attorney, Agent, or Firm* — Finnegan, Henderson, Farabow, Garrett & Dunner, L.L.P.

(57) ABSTRACT

MTID of a terminal apparatus is preliminarily registered into a database of an ISP. In step S2, when a power source of the terminal apparatus is turned on first, (MTID=B) is transmitted from the terminal apparatus to a router. A transmission signal is received by the router and (HGWID=A, MTID=B) is transmitted from the router to the ISP. If (HGWID=A, MTID=B) has been registered in the database, the ISP transmits a permission message in step S5. In step S6, an IP address for a new terminal apparatus is allocated and the new terminal apparatus can participate in a homenetwork. If (HGWID=A, MTID=B) is not registered, a refusal message is sent to the router.

10 Claims, 11 Drawing Sheets

(56) References Cited

U.S. PATENT DOCUMENTS

| | | | |
|---|---|---|---|
| 5,987,524 A * | 11/1999 | Yoshida et al. | 709/245 |
| 6,163,843 A | 12/2000 | Inoue et al. | |
| 6,201,958 B1 | 3/2001 | Boucher | |
| 6,253,327 B1 | 6/2001 | Zhang et al. | |
| 6,370,126 B1 * | 4/2002 | De Baere et al. | 370/316 |
| 6,412,025 B1 * | 6/2002 | Cheston et al. | 710/8 |
| 6,523,696 B1 * | 2/2003 | Saito et al. | 709/223 |
| 6,907,017 B2 | 6/2005 | Reddy et al. | |
| 6,931,018 B1 * | 8/2005 | Fisher | 370/401 |
| 7,027,566 B2 * | 4/2006 | Bossemeyer et al. | 379/88.02 |
| 7,085,836 B1 * | 8/2006 | Turner | 709/226 |
| 7,142,503 B1 * | 11/2006 | Grant et al. | 370/217 |
| 7,577,725 B1 * | 8/2009 | Sitaraman et al. | 709/221 |
| 2002/0004832 A1 | 1/2002 | Yoon et al. | |
| 2005/0256938 A1 * | 11/2005 | Margolin | 709/218 |

FOREIGN PATENT DOCUMENTS

| | | |
|---|---|---|
| JP | 2000-236342 | 8/2000 |
| JP | 2000-324096 | 11/2000 |
| JP | 2001-53901 | 2/2001 |
| JP | 2001-144812 | 5/2001 |
| JP | 2001-189722 | 7/2001 |
| JP | 2001-306519 | 11/2001 |
| JP | 2002-281061 | 9/2002 |
| WO | WO 9820646 | 5/1998 |
| WO | WO 0062484 | 10/2000 |
| WO | WO 0111450 | 2/2001 |

OTHER PUBLICATIONS

Official communication from Japan Patent Office in counterpart Japanese Patent Application No. 2011-023865, dated Apr. 10, 2012, 7 pages.

* cited by examiner

NETWORK SYSTEM

This is a divisional of U.S. application Ser. No. 10/276,627, which is a national stage filing under 35 U.S.C. §371 of PCT/JP02/02581, filed on Mar. 19, 2002, and which claims priority to JP 2001-078740, filed on Mar. 19, 2001, JP 2001-078741, filed on Mar. 19, 2001, and JP 2001-078742, filed on Mar. 19, 2001, all of which are incorporated herein by reference in their entireties.

TECHNICAL FIELD

The invention relates to a network system, a connecting apparatus, a connecting method, a network, a router, a terminal apparatus, a communicating method, a program, and a recording medium which can be applied to a case of connecting the network in a home to the Internet.

BACKGROUND ART

Contents transmitted into a home via the Internet is usually sent to a personal computer. Compression music data, image data, and the like which were downloaded are stored into the personal computer. The user tries to reproduce those contents which arrived at the personal computer by an AV (audio and/or visual) apparatus other than the personal computer. However, if a network in the home does not exist, it is difficult to realize such a request.

As network architectures, an Internet protocol system called TCP/IP (Transmission Control Protocol/Internet Protocol) used in the Internet and an OSI (Open System Interface) basic reference model have been known. The OSI reference model comprises seven layers. The first layer is a physical layer. The second layer is a data link layer. The third layer is a network layer. The fourth layer is a transport layer. The fifth layer is a session layer. The sixth layer is a presentation layer. The seventh layer is an application layer. In the physical layer, a physical mutual connection is made. Data is handled as a bit train here. In the data link layer, a physical communication path to a communication partner is assured and a competition control or the like is performed. Data is handled here as a unit such as a frame or the like which has been more structured.

The TCP/IP comprises four concept layers: a network interface layer, an Internet layer, a transport layer, and an application layer. Those layers are constructed on the physical layer. They can be made to correspond to those of the OSI reference model as follows: the data link layer→the network interface layer; the network layer→the Internet layer; the transport layer→the transport layer; the session layer, presentation layer, application layer→the application layer. The network interface layer is a layer for assuring communication in one subnetwork. For example, a PPP (Point-to-Point Protocol) for making communication between two points corresponds to the network interface layer.

The PPP (Point-to-Point Protocol) is a protocol which is used as a standard protocol by a dial-up IP connection. Data communication by a plurality of protocol authentication is provided by a line which is connected in a one-to-one correspondence relation. As a connecting procedure, a link is established via 1) a link establishing request, 2) authentication of a connecting person, and 3) an information exchange of every protocol.

As networks in the home, wire transmission systems such as IEEE (Institute of Electrical and Electronics Engineers) 1394, Ethernet, and the like, and several wireless transmission systems have been proposed. As wireless transmission systems, IEEE802.11, Bluetooth (trademark), Wireless1394, and the like have been proposed. The networks in the home according to those various transmission systems construct an LAN (Local Area Network).

In recent years, the number of terminal apparatuses which are connected to the network in the home has been increasing. Each terminal apparatus is not limited to communication which is merely made to a specific target but is also connected to the Internet and can be also referred to from a network over the LAN. In order to allow the terminal apparatus to participate in such a network, there is needed a terminal apparatus called a router for at least allowing information to pass from one LAN to another LAN and enabling an information exchange with another terminal apparatus in the network to which the relevant terminal apparatus has been connected.

Although the setting of routing of the router is performed by the user, since the setting operation is technical and expert, when the user newly connects a terminal apparatus, it is necessary to execute the troublesome setting operation.

The foregoing general network architecture, for example, the TCP/IP protocol is also applied to the homenetwork. In the case where the homenetwork is a wireless network, in order to prevent the third person from looking surreptitiously, it is desirable to perform an authentication encryption at the level of the data link layer. Since the setting operation of the router having the wireless data link for such a purpose is technical and expert, when the user newly connects a terminal apparatus, it is necessary to execute the troublesome setting operation.

Further, from a point of protection of personal information, it is demanded that the homenetwork is a secure network. Hitherto, a firewall has been provided between the public network and the private network. This is because it is intended to prevent a person called a cracker who invade illegally the network. However, such a homenetwork depends on the provided firewall and the homenetwork does not become open, so that there is a problem such that it becomes an obstacle in case of developing a variety of kinds of applications.

It is, therefore, the first object of the invention is to provide a network system for enabling the user to easily connect a terminal apparatus to a router.

The second object of the invention is to provide a network system for enabling authentication at a data link level although the setting operation of a router having a wireless data link is unnecessary.

The third object of the invention is to provide a network system which can construct a secure network without providing a firewall.

DISCLOSURE OF INVENTION

To solve the above problems, according to the invention of claim 1, there is provided a network system comprising: a router for permitting or refusing a connection on the basis of one identifier which a terminal apparatus has; and a database in which the router and the terminal apparatus connected thereto have previously been associated, wherein when there is a connecting request from the terminal apparatus, the database is referred to on the basis of the request and in the case where a correspondence of the router and the terminal apparatus has been recorded in the database, the connection of the terminal apparatus which is connected is permitted.

According to the invention of claim 2, there is provided a connecting apparatus in which a network including a router and one or more terminal apparatuses is provided on a terminal side and which provides a service for connecting to the Internet to the terminal side, comprising:

a database in which a correspondence relation between an identifier of the router and identifiers of the terminal apparatuses which are connected to the network has been registered, wherein when a terminal apparatus is newly connected to the network, whether a correspondence relation between an identifier of the router which is sent from the user's side and an identifier of the terminal apparatus exists in the database or not is discriminated, and at least one of permission information which is formed when the correspondence relation exists and used to permit the connection of the new terminal apparatus to the network and refusal information which is formed when the correspondence relation does not exist and used to refuse the connection of the new terminal apparatus to the network is transmitted to the terminal side.

According to the invention of claim 5, there is provided a connecting method in which a network including a router and one or more terminal apparatuses is provided on a terminal side and which provides a service for connecting to the Internet to the terminal side, wherein a database in which a correspondence relation between an identifier of the router and identifiers of the terminal apparatuses which are connected to the network has been registered, when a terminal apparatus is newly connected to the network, whether a correspondence relation between the identifier of the router which is sent from the user's side and an identifier of the terminal apparatus exists in the database or not is discriminated, and at least one of permission information which is formed when the correspondence relation exists and used to permit the connection of the new terminal apparatus to the network and refusal information which is formed when the correspondence relation does not exist and used to refuse the connection of the new terminal apparatus to the network is transmitted to the terminal side.

According to the invention of claim 8, there is provided a network which is constructed by a router having one identifier and one or more terminal apparatuses each having one identifier and connected to an Internet connecting apparatus via the router, wherein when a terminal apparatus is newly connected to the network, a correspondence relation between the identifier of the router and an identifier of the terminal apparatus is transmitted to the Internet connecting apparatus, at least one of permission information and refusal information formed by the Internet connecting apparatus on the basis of a result of a discrimination with reference to a database is received, and the terminal apparatus can be newly connected only in the case where a fact that the correspondence relation exists in the database is shown by at least one of the permission information and the refusal information.

According to the invention of claim 11, there is provided a program for a network which is constructed by a router having one identifier and one or more terminal apparatuses each having one identifier and connected to an Internet connecting apparatus via the router, wherein the program allows the network to execute:

a procedure for, when a terminal apparatus is newly connected to the network, transmitting a correspondence relation between the identifier of the router and an identifier of the terminal apparatus to the Internet connecting apparatus;

a procedure for receiving at least one of permission information and refusal information formed by the Internet connecting apparatus on the basis of a result of a discrimination with reference to a database; and a procedure for newly connecting the terminal apparatus only in the case where a fact that the correspondence relation exists in the database is shown by at least one of the permission information and the refusal information.

According to the invention of claim 12, there is provided a recording medium on which a program for a network which is constructed by a router having one identifier and one or more terminal apparatuses each having one identifier and connected to an Internet connecting apparatus via the router has been recorded, wherein the program allows the network to execute:

a procedure for, when a terminal apparatus is newly connected to the network, transmitting a correspondence relation between the identifier of the router and an identifier of the terminal apparatus to the Internet connecting apparatus;

a procedure for receiving at least one of permission information and refusal information formed by the Internet connecting apparatus on the basis of a result of a discrimination with reference to a database; and a procedure for newly connecting the terminal apparatus only in the case where a fact that the correspondence relation exists in the database is shown by at least one of the permission information and the refusal information.

According to the invention, only in case of a combination of the router and the terminal apparatus which has been registered in the database provided for an Internet service provider, the connection is permitted to the network such as a homenetwork or the like. The user does not need to set the router by himself and can easily allow the terminal apparatus to participate newly in the network such as a homenetwork or the like. It is also possible to prevent an unregistered terminal apparatus from being connected to the network such as a homenetwork or the like, so that the security of the network can be improved.

To solve the above problems, according to the invention of claim 13, there is provided a network system in which a router and a terminal apparatus are connected in a wireless manner, wherein one identifier is recorded, a removable recording medium is provided, the recording medium is loaded into the router and, thereafter, attached to the terminal apparatus, and the router reads out the identifier, thereby allowing a link between the router and the terminal apparatus specified by the identifier to be established.

According to the invention of claim 16, there is provided a router for exchanging information between terminal apparatuses connected in a wireless manner, wherein one identifier is recorded, a removable recording medium is provided, the identifier is read out from the loaded recording medium, and a link with the terminal apparatus which is specified by the identifier is established.

According to the invention of claim 19, there is provided a terminal apparatus for exchanging information in a wireless manner, wherein one identifier is recorded, a removable recording medium is detachably provided, the identifier is read out from the loaded recording medium, and a link is established by the identifier at the time of wireless communication.

According to the invention of claim 20, there is provided a communicating method in a network system in which a router and a terminal apparatus are connected in a wireless manner, comprising:

a step wherein one identifier is recorded and a removable recording medium is provided;

a step wherein the recording medium is loaded into the router and the router reads out the identifier;

a step wherein the recording medium is attached to the terminal apparatus and the terminal apparatus reads out the identifier; and a step wherein the router detects that the terminal apparatus is specified by the identifier, thereby establishing a link between the router and the terminal apparatus.

According to the invention of claim 21, there is provided a program for a network system in which a router, a terminal apparatus are connected in a wireless manner and one identifier is recorded, and a removable recording medium is provided, wherein the program allows the network system to execute:

a step wherein the recording medium is loaded into the router and the router reads out the identifier;

a step wherein the recording medium is attached to the terminal apparatus and the terminal apparatus reads out the identifier; and a step wherein the router detects that the terminal apparatus is specified by the identifier, thereby establishing a link between the router and the terminal apparatus.

According to the invention of claim 22, there is provided a recording medium on which a program for a network system in which a router and a terminal apparatus are connected in a wireless manner, one identifier is recorded, and a removable recording medium is provided has been recorded, wherein the program allows the network system to execute:

a step wherein the recording medium is loaded into the router and the router reads out the identifier;

a step wherein the recording medium is loaded into the terminal apparatus and the terminal apparatus reads out the identifier; and a step wherein the router detects that the terminal apparatus is specified by the identifier, thereby establishing a link between the router and the terminal apparatus.

According to the invention, the recording medium is loaded into the router and the router reads out the identifier on the recording medium, so that the authentication for allowing the router and the terminal apparatus which is specified by the identifier to communicate can be performed. Therefore, the user does not need to execute the troublesome operation such as setting of the router or the like.

Further, to solve the foregoing problems, according to the invention of claim 23, there is provided a network system in which a server and a router are connected via a network and one or more terminal apparatuses are connected to the router, wherein the server has a database in which a correspondence relation between an identifier of the router and identifiers of the terminal apparatuses connected to the network has been registered, when the first and second terminal apparatuses communicate with each other, the server is inquired about whether the identifiers of the first and second terminal apparatuses have been registered as a same group onto the database or not, and when the correspondence relation exists, the first and second terminal apparatuses can communicate.

According to the invention of claim 26, there is provided a terminal apparatus which is connected to a network system, wherein when there is a communicating request from another terminal apparatus, an external server is inquired about an identifier of such another terminal apparatus via a router, whether such another terminal apparatus belongs to a same group or not is discriminated with reference to a database of the server, and only when such another terminal apparatus belongs to the same group, communication with such another terminal apparatus can be made.

According to the invention of claim 28, there is provided a communicating method in a network system in which a server and a router are connected via a network, one or more terminal apparatuses are connected to the router, and the server has a database in which a correspondence relation between an identifier of the router and identifiers of the terminal apparatuses which are connected to the network has been registered, comprising the steps of:

when the first and second terminal apparatuses communicate with each other, inquiring of the server about whether the identifiers of the first and second terminal apparatuses have been registered as a same group onto the database or not; and when the correspondence relation exists, determining that the first and second terminal apparatuses can communicate.

According to the invention of claim 31, there is provided a program for a communicating method in a network system in which a server and a router are connected via a network, one or more terminal apparatuses are connected to the router, and the server has a database in which a correspondence relation between an identifier of the router and identifiers of the terminal apparatuses which are connected to the network has been registered, wherein the program allows the network system to execute the steps of:

when the first and second terminal apparatuses communicate with each other, inquiring of the server about whether the identifiers of the first and second terminal apparatuses have been registered as a same group onto the database or not; and when the correspondence relation exists, determining that the first and second terminal apparatuses can communicate.

According to the invention of claim 32, there is provided a recording medium on which a program for a communicating method in a network system in which a server and a router are connected via a network, one or more terminal apparatuses are connected to the router, and the server has a database in which a correspondence relation between an identifier of the router and identifiers of the terminal apparatuses which are connected to the network has been registered has been recorded, wherein the program allows the network system to execute the steps of:

when the first and second terminal apparatuses communicate with each other, inquiring of the server about whether the identifiers of the first and second terminal apparatuses have been registered as a same group onto the database or not; and when the correspondence relation exists, determining that the first and second terminal apparatuses can communicate.

According to the invention, by referring to an identifier of a partner side with which communication is made, whether the partner's identifier belongs to the same group as a user's own identifier or not is discriminated for the database provided for the server. If it belongs to the same group, it is determined that the authentication between the terminals is satisfied, so that the link is established. The secure network can be constructed without implementing a firewall, and the homenetwork can be set to be open.

BEST MODE FOR CARRYING OUT THE INVENTION

First Embodiment

Figure 1:
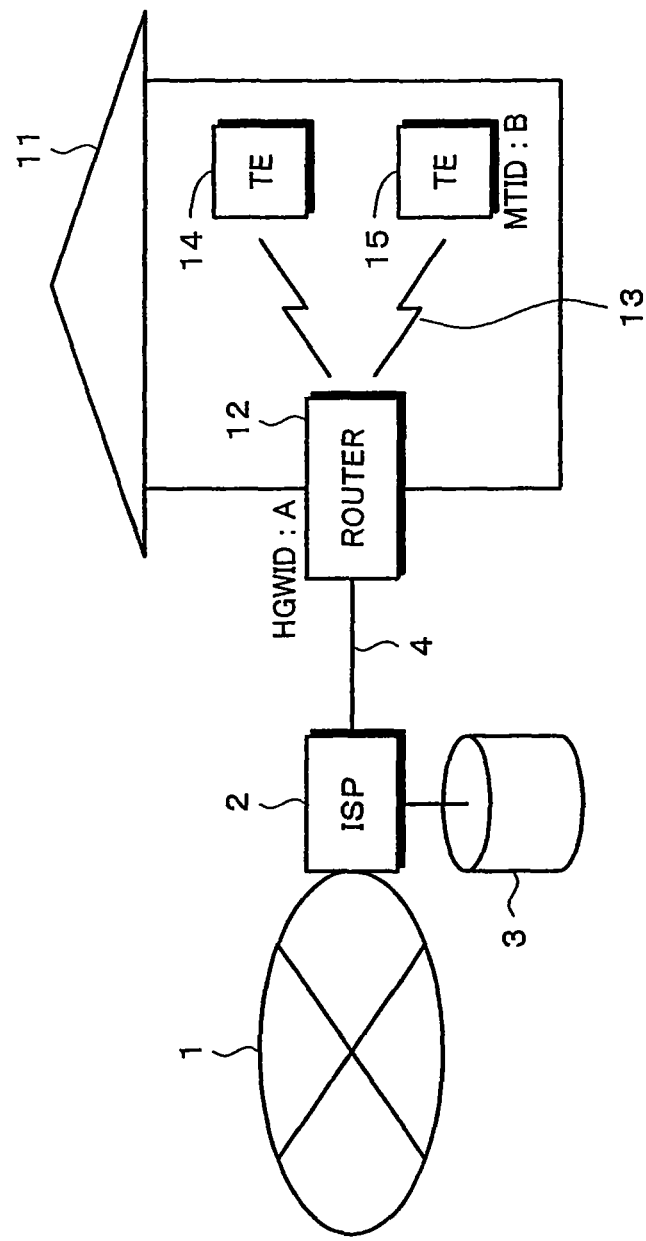
FIG. 1 is a block diagram showing a construction of a network system according to the first embodiment of the invention.

An embodiment of the invention will be described hereinbelow. FIG. 1 shows an example of a system of the first embodiment of the invention. Reference numeral 1 denotes an Internet; 2 indicates an ISP (Internet Service Provider) connected to the Internet 1. The ISP 2 has a mail server, a DNS (Domain Name System) server, a Proxy server, and the like, provides an ordinary Internet connecting function, and has a database 3 for authentication.

Reference numeral 11 denotes a home; and 12 indicates a home gateway, for example, a router. The ISP 2 and router 12 are connected by a bidirectional access line 4 such as ISDN (Integrated Services Digital Network) line, dedicated line, xDSL (x Digital Subscriber Line) like an ADSL (Asymmetric Digital Subscriber Line) or the like, optical fiber, or the like. In case of using the ISDN line as a bidirectional access line 4, a DSU (Digital Service Unit) (not shown) and a TA (Terminal Adapter) if necessary are inserted between the router 12 and the ISDN line.

A service company of a cable television can be also connected by using a cable television line as a bidirectional access line 4. The service company distributes audio and/or visual contents via a cable television base station and a digital set-top box provided in the home 11. Such a service company of the cable television is also a kind of ISP 2 for providing a service for connecting to the Internet.

In the embodiment, a homenetwork such as a wireless LAN shown at reference numeral 13 is installed in the home 11. IEEE802.11x including IEEE802.11, Bluetooth, Wireless1394, or the like can be used as a wireless LAN. The homenetwork 13 is not limited to the wireless LAN but a wire LAN using a telephone line, a power line, or a cable can be also used. Further, the homenetwork 13 can also include a plurality of networks. For example, it is also possible to connect a cellular phone by the wireless LAN and connect the cellular phone to another apparatus by Bluetooth.

A terminal apparatus 14 is connected to the homenetwork 13. Reference numeral 15 denotes a terminal apparatus to be newly connected to the homenetwork 13. A personal computer (desktop type or notebook-sized type), an audio apparatus such as a CD (Compact Disc) player or the like, a television concerning apparatus such as tuner, display, or the like, a video recorder/player such as a DVD (Digital Versatile Disc or Digital Video Disc) apparatus or the like, or a terminal apparatus such as a portable information apparatus or the like can be connected to the homenetwork 13. Further, household appliances such as air-conditioner, refrigerator, and the like can be connected to the homenetwork 13.

Various data is supplied from the ISP 2 via the router 12 to each of the terminal apparatuses connected to the homenetwork 13. For example, contents data such as audio data, video data, etc. is supplied to the router 12. At the same time, the terminal apparatuses connected to the homenetwork 13 can communicate with each other.

Figure 2:
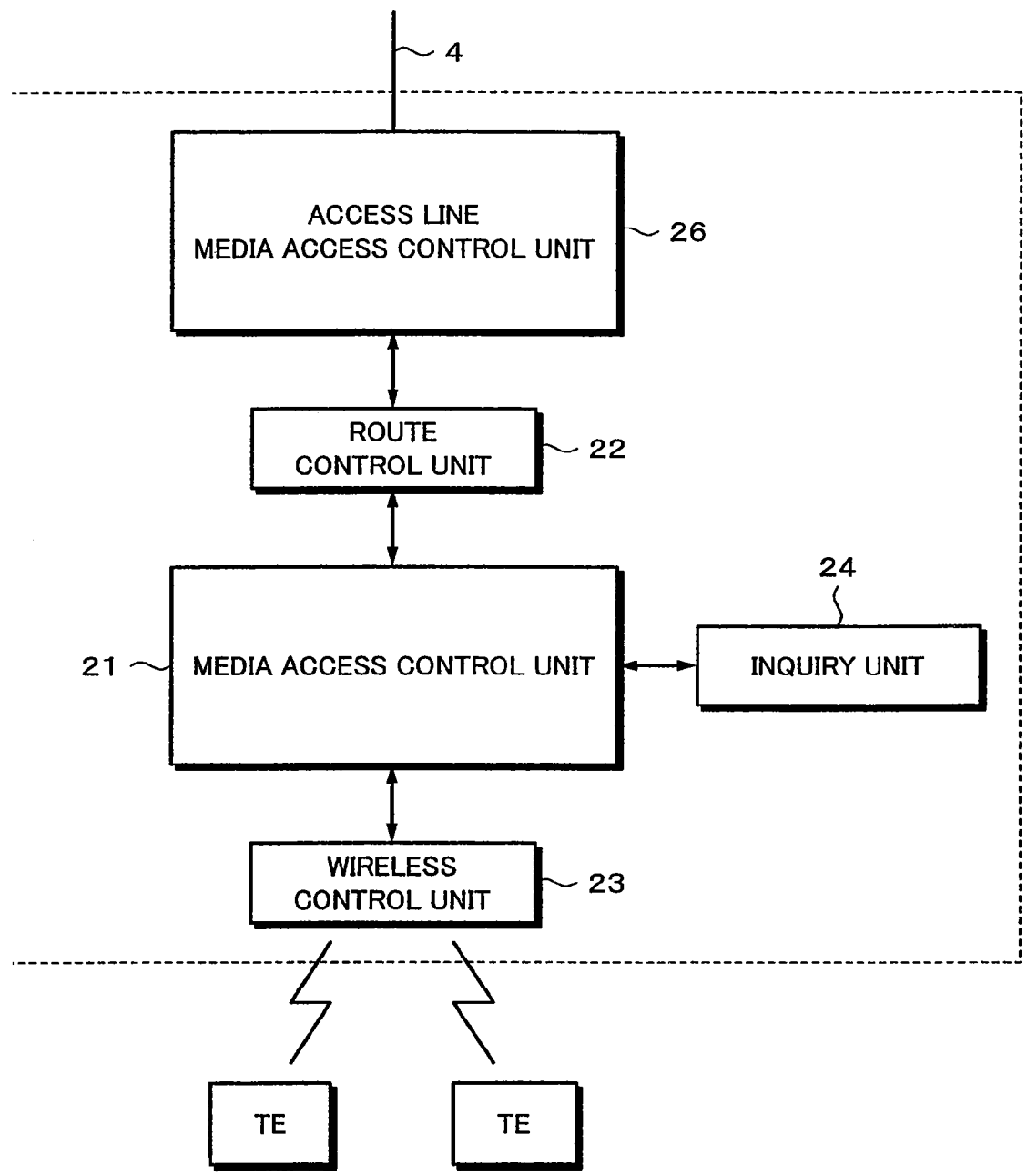
FIG. 2 is a block diagram showing an example of a construction of a router in the first embodiment of the invention.

FIG. 2 schematically shows a construction of the router 12. The router 12 comprises: a media access control unit 21; a route control unit 22; a wireless control unit 23; an inquiry unit 24; and an access line media access control unit 26. The media access control unit 21 controls transmission of data to a transmission medium such as a wireless LAN (homenetwork 13). A plurality of terminal apparatuses 14 and 15 are mutually connected by the wireless control unit 23 in a wireless manner. The route control unit 22 is connected to the bidirectional access line 4. The inquiry unit 24 communicates with the ISP 2 via the media access control unit 21 and route control unit 23 and inquires of the ISP 2 about permission or refusal of connection of the new terminal apparatus 15.

Each of the router 12 and the terminal apparatuses 14 and 15 has one ID (identifier) in the ISP. The ID of the terminal apparatus is expressed by MTID and the ID of the router 12 is expressed by HGWID.

Information of a combination of HGWID of the router 12 and MTID of the terminal apparatus has previously been registered in the database 3 provided for the ISP 2. For example, a registering process to the database 3 is executed by a sales shop which sold the terminal apparatus. Specifically speaking, assuming that HGWID of the router 12 is set to HGWID=A and MTID of the terminal apparatus 15 is set to MTID=B, when the user purchases the terminal apparatus 15, the user brings by himself a card in which HGWID of the router 12 at home has been recorded to the shop. On the basis of information of the router and information of the terminal apparatus 15, the shop registers data showing a correspondence relation of (HGWID=A and MTID=B) into the database 3. A symbol added to the ID has a meaning for specifying each ID and does not denote a value of the data. A data construction of the ID has a predetermined format such as a bit length or the like and, preferably, has been encrypted.

The registering method into the database 3 is not limited to the above method. For example, if a contract for sale has been made via the Internet 1 and ISP 2, on the basis of the information of the router to which the terminal apparatus in which software for such communication has been implemented is connected, the ISP 2 or the receiving side of an order can register the data indicative of the correspondence relation between HGWID of the router and MTID of the terminal apparatus into the database 3.

Figure 3:
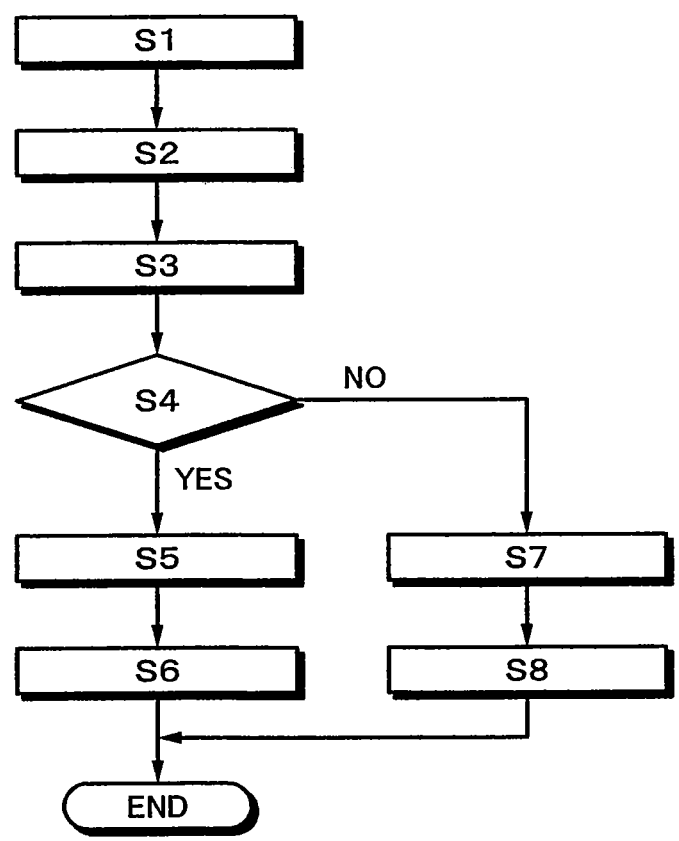
FIG. 3 is a flowchart for explaining processes in case of allowing a new terminal apparatus to participate in a homenetwork in the first embodiment of the invention.

A flow of processes which are executed at the time when the new terminal apparatus 15 is connected to the homenetwork 13 will be described with reference to FIG. 3. The flow of those processes corresponds to a program which is installed into the router 12 or another computer and which controls the homenetwork 13. As necessary, this program is recorded into a computer-readable recording medium. Step S1 relates to a process for preliminarily registering MTID of the terminal apparatus (TE) 15 into the database 3 as mentioned above and it is executed separately from subsequent processes.

In step S2, if the initial operation of the terminal apparatus 15, for example, the operation to first turn on a power source is executed in the home 11, the user transmits (MTID=B) from the terminal apparatus 15 to the router 12. A transmission signal of the terminal apparatus 15 is received by the wireless control unit 23 of the router 12. MTID is supplied to the inquiry unit 24 via the media access control unit 21.

The inquiry unit 24 can process a signal including MTID from the terminal apparatus 15 which is not registered yet into the homenetwork 13. In the inquiry unit 24, HGWID of the router 12 has been held. (HGWID=A and MTID=B) is transmitted from the inquiry unit 24 to the ISP 2 via the route control unit 22, access line media access control unit 26, and bidirectional access line 4 (step S3).

The ISP 2 discriminates whether the combination of the IDs (HGWID=A and MTID=B) has been registered in the database 3 or not by referring to the database 3. If it has been registered, that is, if matching is satisfied in step S4, the ISP 2 transmits a permission message to the router 12 via the bidirectional access line 4 in step S5.

In the router 12, the permission message is sent to the inquiry unit 24 via the access line media access control unit 26, route control unit 22, and media access control unit 21 of the router 12. In step S6, in case of an IPv4 (Internet Protocol version 4), an IP address is allocated to the new terminal apparatus 15 by a DHCP (Dynamic Host Configuration Protocol, RFC 2131). In case of IPv6, an IP network prefix is allocated. Thus, the new terminal apparatus 15 can participate in the homenetwork 13. Various settings which are necessary for connecting the terminal apparatus 15 to the homenetwork 13 are also executed by the permission message and the user himself hardly needs to perform the setting operation.

If it is determined in step S4 that the combination of the IDs (HGWID=A and MTID=B) is not registered in the database 3 yet, a refusal message is sent to the inquiry unit 24 via the route control unit 22 and media access control unit 21 of the router 12 in step S7. In this case, since the router 12 recognizes that the new terminal apparatus is an apparatus which must not be connected to the homenetwork 13, this terminal apparatus cannot participate in the homenetwork 13.

Second Embodiment

Figure 4:
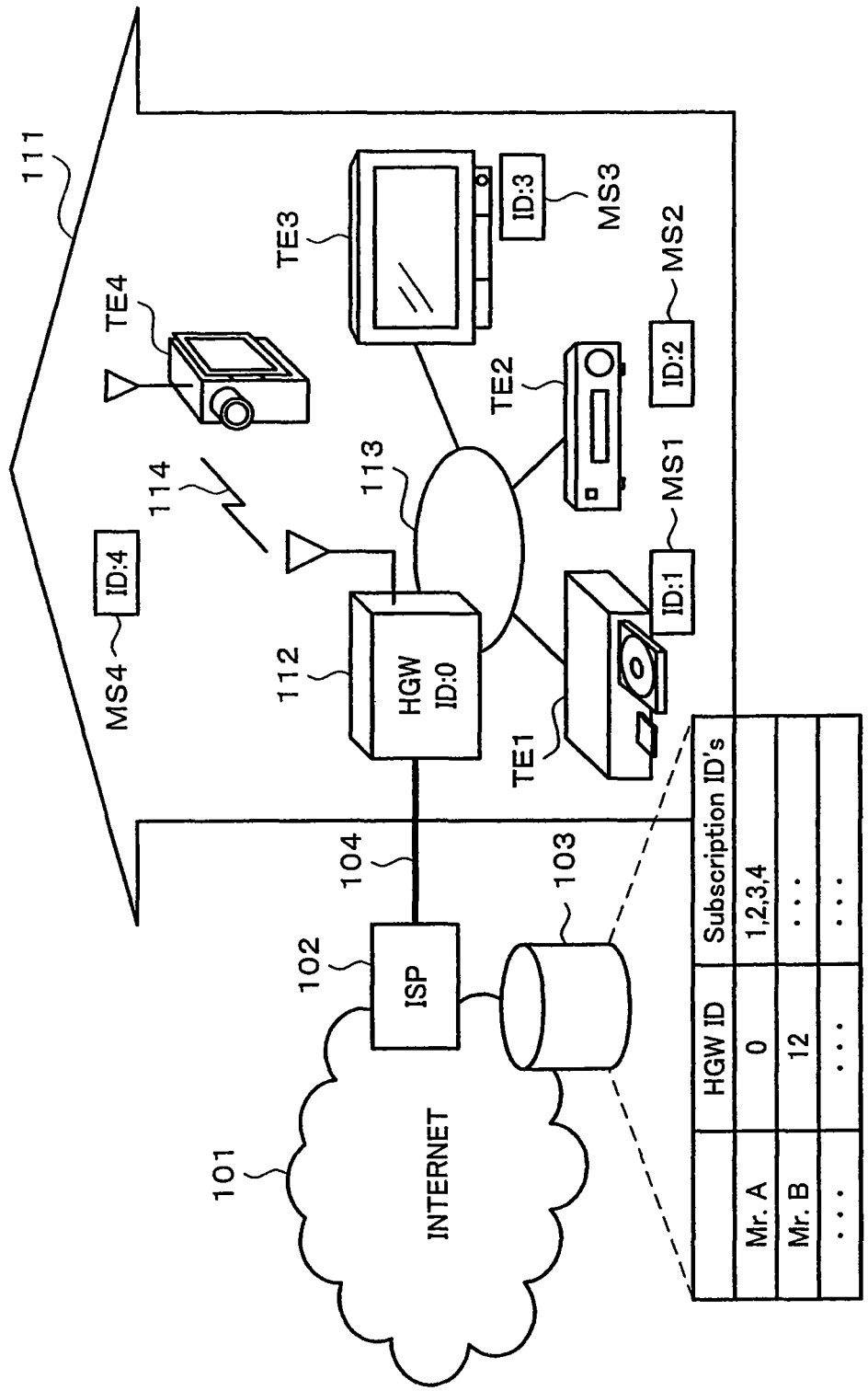
FIG. 4 is a block diagram showing a construction of a network system according to the second embodiment of the invention.

FIG. 4 shows an example of a system according to the second embodiment of the invention. Reference numeral 101 denotes an Internet and 102 indicates an ISP (Internet Service Provider) serving as a server connected to the Internet 101. The ISP 102 has a mail server, a DNS (Domain Name System) server, a Proxy server, and the like, provides an ordinary Internet connecting function, and has a database 103 for authentication.

Reference numeral 111 denotes a home; and 112 indicates a home gateway, for example, a router. The ISP 102 and router 112 are connected by a bidirectional access line 104 such as ISDN (Integrated Services Digital Network) line, dedicated line, xDSL (x Digital Subscriber Line) like an ADSL (Asymmetric Digital Subscriber Line) or the like, optical fiber, or the like. In case of using the ISDN as a bidirectional access line 104, a DSU (Digital Service Unit) (not shown) and a TA (Terminal Adapter) if necessary are inserted between the router 112 and the ISDN.

A service company of a cable television can be also connected by using a cable television line as a bidirectional access line 104. The service company distributes audio and/or visual contents via a cable television base station and a digital set-top box provided in the home 111. Such a service company of the cable television is also a kind of ISP 102 for providing a service for connecting to the Internet.

In the embodiment, a wire LAN shown at reference numeral 113 and a wireless LAN 114 are installed in the home 111. The wire LAN 113 and wireless LAN 114 construct a homenetwork. IEEE802.11x including IEEE802.11, Bluetooth, Wireless1394, or the like can be used as a wireless LAN 114. The homenetwork can also include another network. For example, it is also possible to connect a cellular phone by the wireless LAN and connect the cellular phone to another apparatus by Bluetooth. Although the invention is characterized by a connection control of an apparatus which is connected in a wireless manner, the embodiment will be described with respect to an apparatus which exists mixedly with an apparatus which is connected by a wire.

Terminal apparatuses TE1, TE2, and TE3 are connected to the wire LAN 113. TE4 denotes a terminal apparatus to be newly connected to the wireless LAN 114. A personal computer (desktop type or notebook-sized type), an audio apparatus such as a CD (Compact Disc) player or the like, a television concerning apparatus such as tuner, display, or the like, a video recorder/player such as a DVD (Digital Versatile Disc or Digital Video Disc) apparatus or the like, or a portable information apparatus, or the like can be connected as a terminal apparatus. Further, household appliances such as air conditioner, refrigerator, and the like can be connected to the homenetwork.

Various data is supplied from the ISP 102 via the router 112 to each of the terminal apparatuses connected to the wire LAN 113 and wireless LAN 114. For example, contents data such as audio data, video data, etc. is supplied to the router 112. At the same time, the terminal apparatuses connected to the wire LAN 113 and/or the wireless LAN 114 can communicate with each other.

In case of the homenetwork which is managed by the ISP 102, each terminal apparatus has one identifier in the ISP. The ISP 102 preliminarily records the identifier onto a recording medium (that is, removable recording medium) which is detachable to/from the terminal apparatus. As a recording medium, it is possible to use an information recording medium which can generally hold information such as IC card (also called a memory card) for recording information into a flash memory, magnetic card for recording information onto a magnetic material, plastic card for recording information as a graphic pattern such as a bar code or the like, or the like. In the embodiment, the IC card is used. The IC card can also have a function of an LAN card or the like in addition to a function for holding the identifier. The router 112 also has an identifier (ID:0) of the router itself.

The IC card in which the identifier (ID) has been recorded is detachable to/from the router 112 and each terminal apparatus. (ID:1) is recorded in an IC card MS1 loaded into the terminal apparatus TE1. (ID:2) is recorded in an IC card MS2 loaded into the terminal apparatus TE2. (ID:3) is recorded in an IC card MS3 loaded into the terminal apparatus TE3. Further, (ID:4) is recorded in an IC card MS4 which is loaded into the terminal apparatus TE4. A numeral added to the ID has a meaning for specifying each ID and does not denote a value of the data. A data construction of the ID has a predetermined format such as a bit length or the like and, preferably, has been encrypted.

If the user intends to connect the terminal apparatus TE4 to the wireless LAN 114, he requests the ISP 102 to issue a new identifier (ID:4). That is, the user receives distribution of the IC card MS4 on which such an identifier has been recorded.

Figure 5:
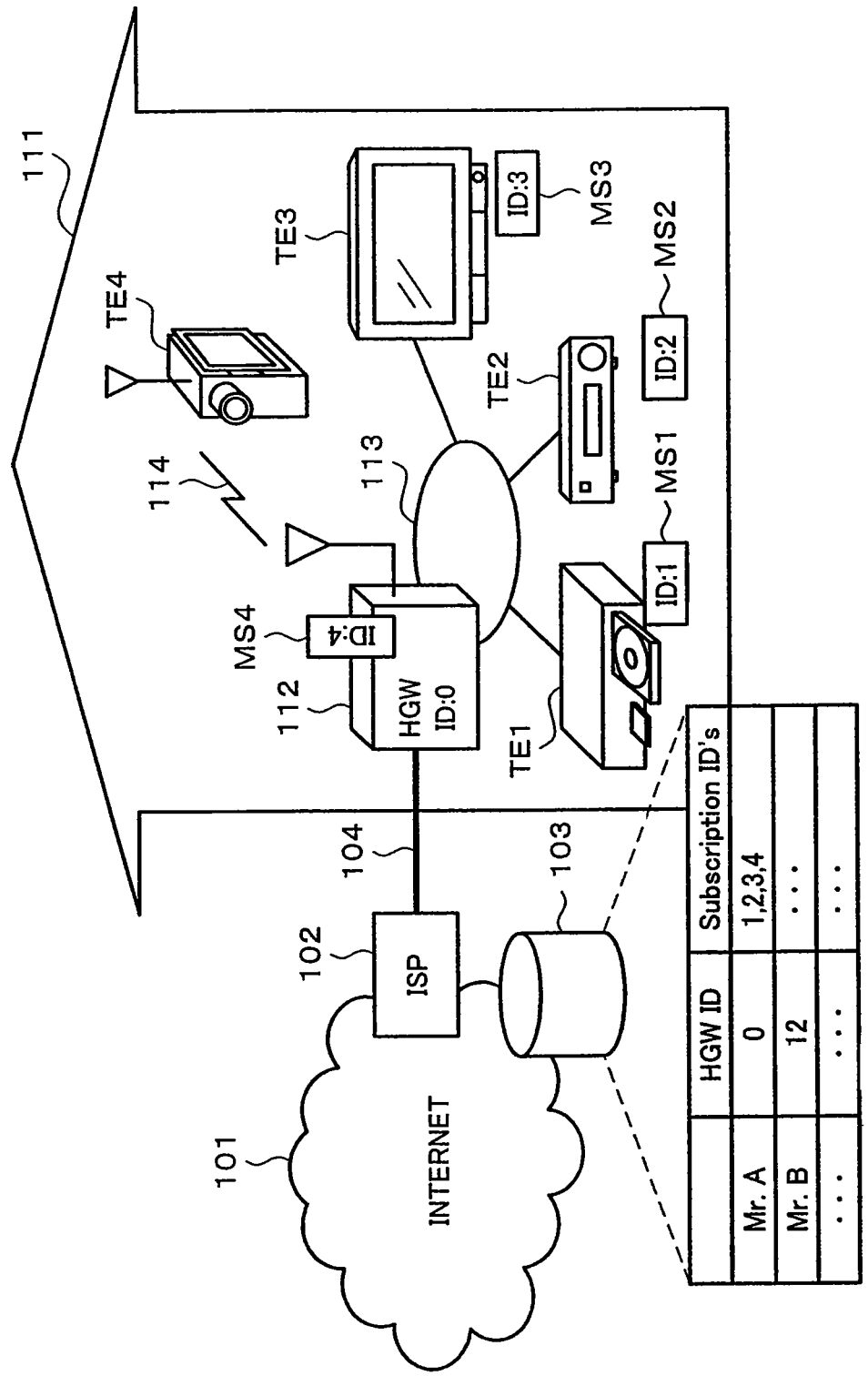
FIG. 5 is a block diagram showing a construction of the network system in the second embodiment of the invention.

FIG. 4 shows a stage at which the user obtained the IC card MS4. As shown in FIG. 5, the IC card MS4 is loaded into the router 112. The router 112 reads out the identifier (ID:4) from the IC card MS4 and stores it into the router 112. In other words, (ID:4) is previously registered into the router 112.

After completion of the reading of the identifier and storing into the router 112, the IC card MS4 is removed from the router 112 and loaded again into the terminal apparatus TE4. When the terminal apparatus TE4 communicates with the router 112, by transmitting the identifier (ID:4), authentication at the data link level between the router 112 and the terminal apparatus TE4 is performed. It is also possible to generate an encryption key by using the identifier (ID:4) and encrypt contents of communication as necessary.

As mentioned above, by inserting the IC card MS4 into the router 112 and, subsequently, inserting the IC card MS4 into the terminal apparatus TE4, the authentication at the data link level can be performed. Thus, it is possible to prevent an unauthorized person from looking surreptitiously the contents of the communication of the wireless LAN 114. That is, it is possible to prevent the third person from connecting to the wireless LAN 1 from the outside of the house where the router 112 has been installed. Further, in the embodiment, for the purpose of performing the terminal authentication, the correspondence relation between the ID of the router and the ID of the terminal apparatus has been registered onto the database 3 which the ISP 102 has. The ID of the router 112 is expressed by HGWID.

Information of a combination of HGWID of the router 112 and the ID of the terminal apparatus has previously been registered in the database 103 provided for the ISP 102. For example, a registering process to the database 103 is executed by the ISP 102 and a sales shop when the terminal apparatus is sold. For example, when the user purchases the terminal apparatus TE4, the user brings by himself a card in which HGWID of the router 112 at home has been recorded to the shop. On the basis of information of the router and information of the IC card MS4, the shop registers data showing a correspondence relation of (HGWID: 0, ID: 4) into the database 103. Together with the terminal apparatus TE4, the user obtains the IC card MS4 on which (ID: 4) has previously been recorded.

Naturally, the registering method into the database 103 is not limited to the above method. For example, if a sales contract has been made via the Internet 101 and ISP 102, on the basis of the information of the router to which the terminal apparatus in which software for such communication has been implemented is connected, the ISP 102 or the receiving side of an order can register the data indicative of the correspondence relation between HGWID of the router and the ID of the terminal apparatus into the database 103.

Figure 6:
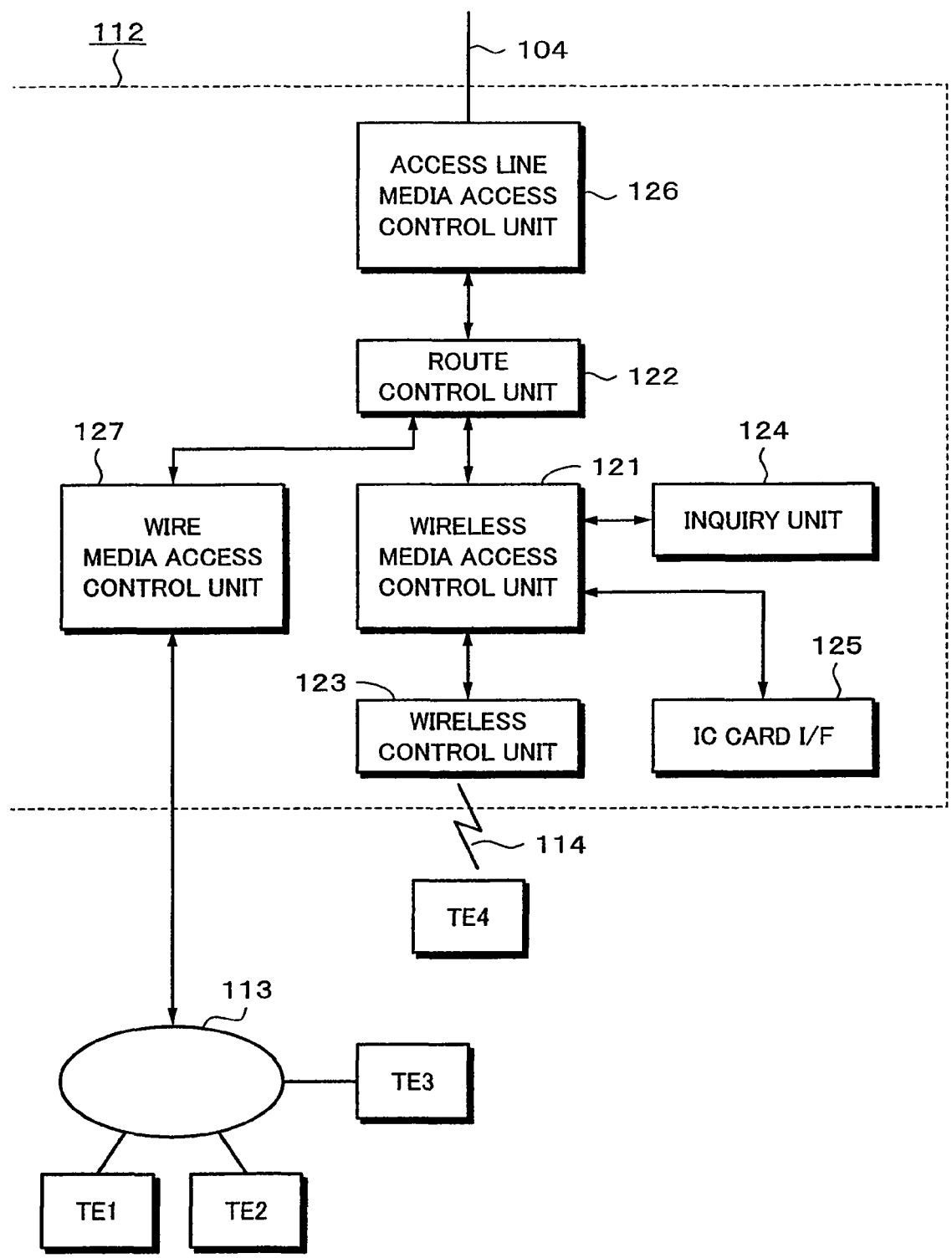
FIG. 6 is a block diagram showing an example of a construction of a router in the second embodiment of the invention.

FIG. 6 schematically shows a construction of the router 112. The router 112 comprises: a wireless media access control unit 121; a route control unit 122; a wireless control unit 123; an inquiry unit 124; an IC card interface 125; an access line media access control unit 126; and a wire media access control unit 127. The wireless media access control unit 121 controls transmission of data to the wireless LAN 114. The wire media access control unit 127 controls transmission of data to the wire LAN 113.

A plurality of terminal apparatuses are mutually connected in a wireless manner by the wireless control unit 123. The route control unit 122 is connected to the bidirectional access line 104. The inquiry unit 124 communicates with the ISP 102 via the wireless media access control unit 121, route control unit 122, and access line media access control unit 126 and inquires of the ISP 102 about permission or refusal of connection of a new terminal apparatus. The IC card interface 125 is an interface of the IC card and can read out the identifier recorded in a predetermined format. Further, key data or the like can be recorded onto the IC card as necessary.

Figure 7:
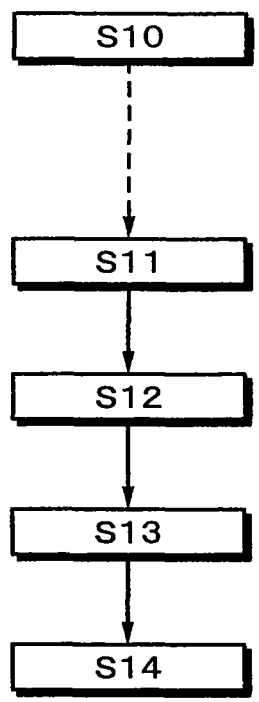
FIG. 7 is a flowchart for explaining an authenticating process at a data link level in the second embodiment of the invention.

The authenticating process at the data link level will be described with reference to a flowchart of FIG. 7. A flow of this process corresponds to a program which is installed into the router 112 or another computer and which controls the wireless LAN 114. As necessary, this program is recorded onto a computer-readable recording medium. However, step S10 relates to a process for previously registering the ID into the database 103 as mentioned above and it is executed separately from subsequent processes.

In first step S11, the IC card is inserted into the router 112. The identifier, for example, (ID:4) recorded in the IC card is read out via the IC card interface 125 of the router 112. Subsequently, in step S12, the IC card is returned (loaded) into the terminal apparatus TE4. Upon communication, in step S13, the terminal apparatus TE4 notifies the router 112 of (ID:4). The router 112 recognizes that the terminal apparatus TE4 has the same ID as the read-out ID. In this manner, the authentication at the data link level between the router 112 and the terminal apparatus TE4 is satisfied in step S14.

Subsequently, the terminal authentication is performed. The terminal authentication is necessary irrespective of the wire manner or the wireless manner and a secure network can be constructed without installing the firewall and performing packet filtering or the like. The terminal authentication will be described hereinbelow.

Figure 8:
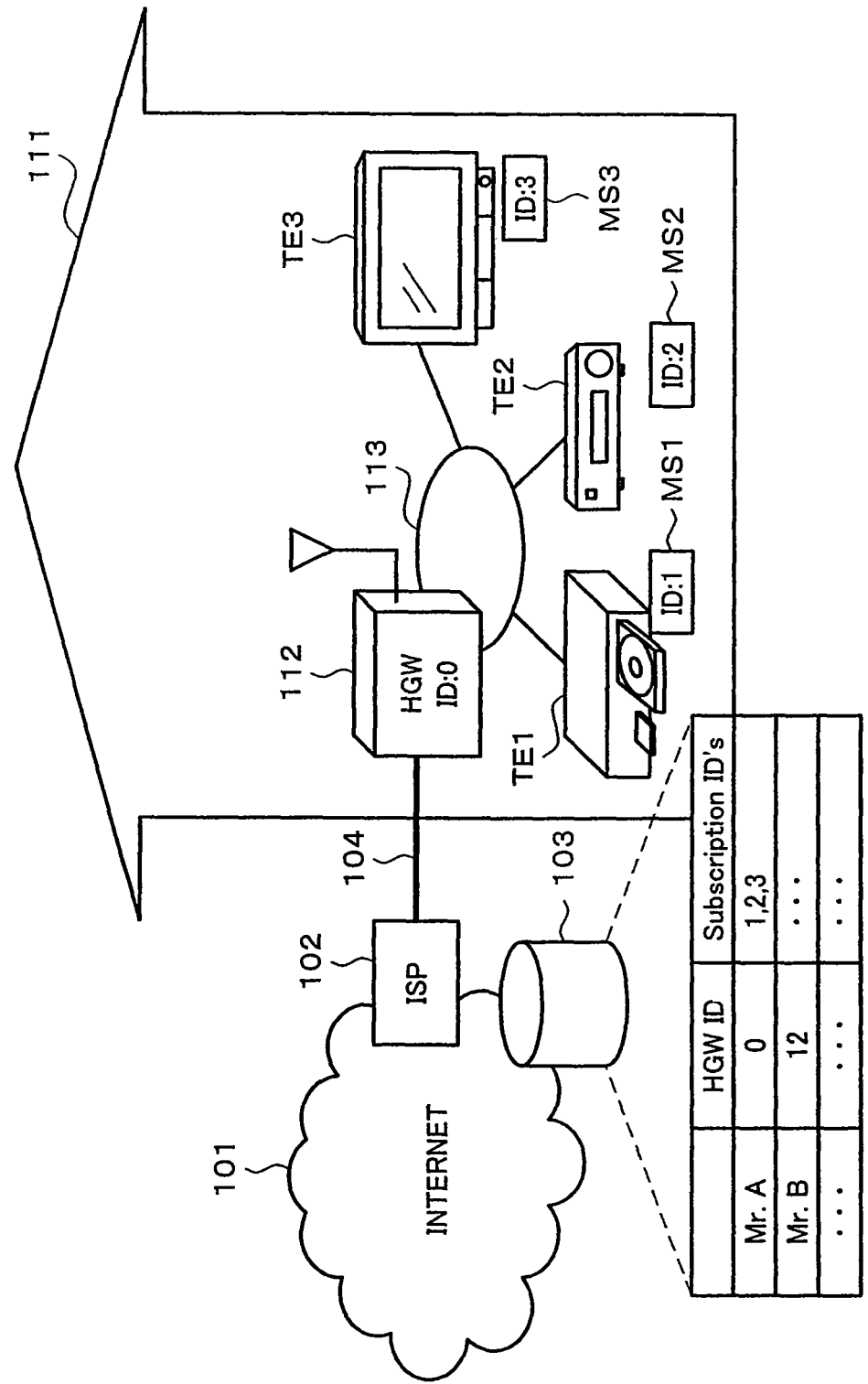
FIG. 8 is a block diagram showing a construction of the network system in the second embodiment of the invention.

FIG. 8 shows a state where the IC cards MS1, MS2, and MS3 have been loaded into the terminal apparatuses TE1, TE2, and TE3 connected to the wire LAN 113, respectively, and the identifiers recorded in those IC cards have been registered in the database 103 of the ISP 102. As a method of registering the identifiers of the terminal apparatuses connected to the wire LAN 113 into the database 103, a method similar to that mentioned above can be used.

Figure 9:
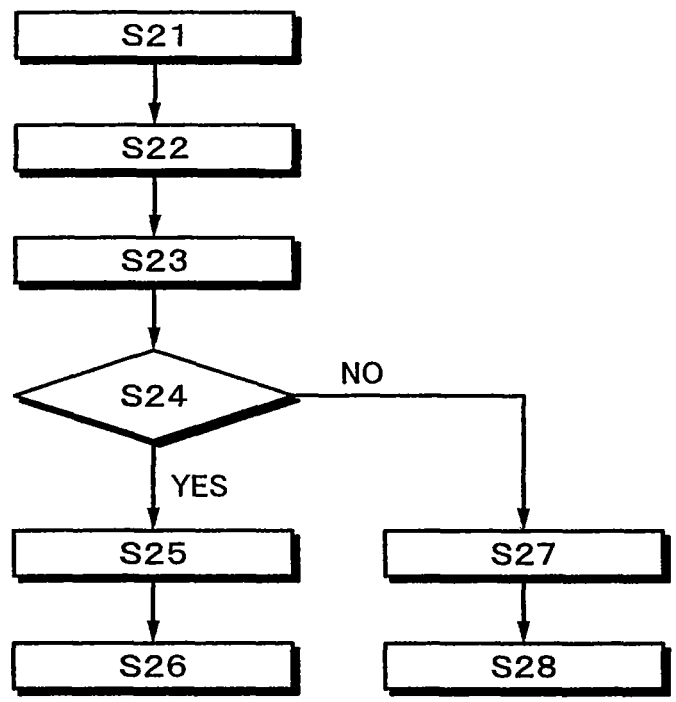
FIG. 9 is a flowchart for explaining a terminal authenticating process in the second embodiment of the invention.

A flow for the terminal authenticating process will be described with reference to FIG. 9. A flow of this process corresponds to a program which is installed into the router 112 or another computer and which controls the wire LAN 113 and wireless LAN 114. As necessary, this program is recorded onto a computer-readable recording medium. The registering process of the ID into the database has previously been executed.

For example, a case where the terminal apparatus TE4 (ID:4) communicates with the terminal apparatus TE3 (ID:3) will be described as an example. In step S21, the terminal apparatus TE4 requests the terminal apparatus TE3 to establish the link. In step S22, the terminal apparatus TE3 which received this request inquires of the ISP 102 via the router 112 about whether the terminal apparatus TE4 belongs to the same group or not. The inquiry unit 124 of the router 112 also transmits the identifier (ID:0) of the router 112 to the ISP 102 in an interlocking relational manner. Desirably, the communication for authentication has been encrypted.

In step S23, the ISP 102 refers to the database 103. In step S24, whether (ID:3) and (ID:4) belong to the same group or not is discriminated. (1, 2, 3, 4) have been registered as IDs in the database 103 with respect to (HGWID:0) (refer to FIGS. 4 and 5). Therefore, it is determined that (ID:3) and (ID:4) belong to the same group.

This result is transmitted from the ISP 102 to the router 112 via the bidirectional access line 104, access line media access control unit 126, and route control unit 122 and, further, transmitted from the router 112 to the terminal apparatus TE3. In case of the same group, the terminal authentication is satisfied (step S25). In step S26, the security between the terminal apparatuses TE3 and TE4 is established. If it is determined in step S24 that they do not belong to the same group, the terminal authentication is not satisfied (step S27). In this case, the security is not established (step S28). In order to assure the security of the homenetwork, if the IC card is pulled out from the terminal apparatus after the link was established, the establishment of the security is invalidated.

Figure 10:
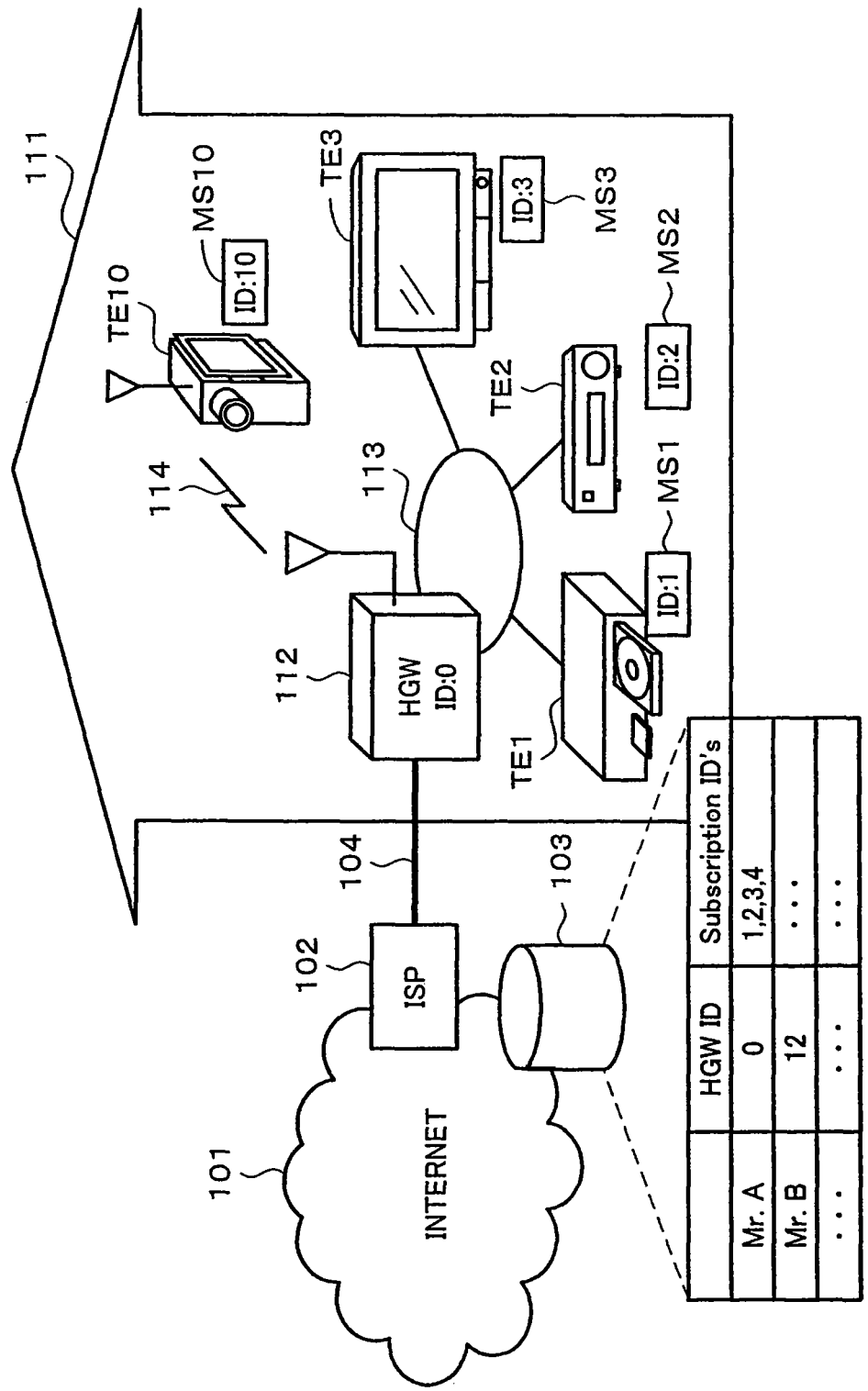
FIG. 10 is a block diagram showing a construction of the network system in the second embodiment of the invention.

FIG. 10 shows a situation where the terminal apparatus registered in a homenetwork of the third person has been connected to the user's own homenetwork. Another terminal apparatus is assumed to be TE10, its IC card is assumed to be MS10, and its identifier is assumed to be (ID:10) In this case, the IC card MS10 is loaded into the router 112, thereby allowing the router 112 to read out (ID:10). Thus, the authentication at the data link level is satisfied. However, in the database 103 of the ISP 102, (ID:10) is not registered as an ID of the same group as that of the router 112 (HGW ID:0). Therefore, terminal authentication is not satisfied.

This means that although the terminal apparatus TE10 can be connected to the Internet 101 via the router 122 and to the homenetwork of that person, it cannot communicate with the terminal apparatus connected to the wire LAN 113 and wireless LAN 114. That is, there is an advantage such that the terminal apparatus having a mechanism for authentication at the data link level using the IC card can communicate with the outside via another homenetwork having a similar mechanism.

Figure 11:
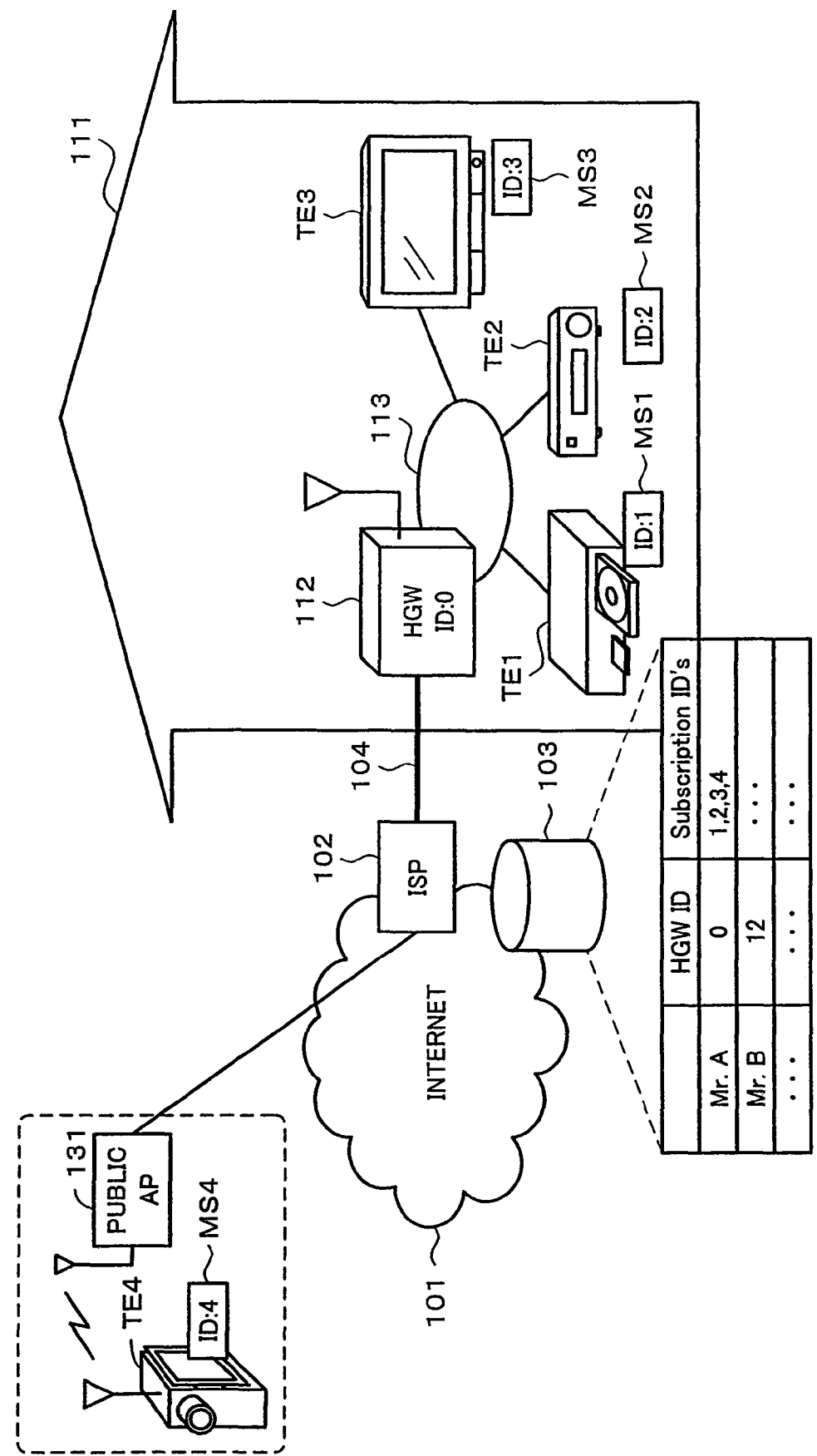
FIG. 11 is a block diagram showing a construction of the network system in the second embodiment of the invention.

Further, FIG. 11 shows an example in which a terminal apparatus, for example, TE4 is brought to the outside of the home and communication is made via a public access point 131. The IC card MS4 on which (ID:4) has been recorded has been loaded into the terminal apparatus TE4. In this case, however, since the IC card MS4 cannot be loaded to the router 112 existing at a remote position, the authentication at the data link level is omitted. However, the public access point 131 can have a construction such that previous registration of the identifier by the IC card can be accepted.

The terminal apparatus TE4 can access the Internet 101 via the public access point 131 and, further, can communicate with the terminal-apparatus of the homenetwork of his own home. In this case, the terminal authentication as mentioned above is executed. Only when the terminal authentication is satisfied, the security is established. As mentioned above, even in the terminal apparatus which is used by the homenetwork, it can be carried out to the outside of the home and used.

The invention is not limited to the foregoing embodiment of the invention but many modifications and applications are possible within the scope without departing from the spirit of the invention. For example, although the foregoing embodiment has been described with respect to the example of the homenetwork, the invention is not limited to the home but can be also applied to a network in a company.

INDUSTRIAL APPLICABILITY

According to the invention, the network system in which only a combination of the router and the terminal apparatus which has been registered in the database provided for the Internet service provider can be connected to the network can be realized. The user does not need to set the router by himself but can enable the terminal apparatus to participate newly in the network such as a homenetwork or the like. According to the invention, it is possible to prevent the unregistered terminal apparatus from being connected to the network such as a homenetwork or the like, so that the security of the network can be improved. For example, a cellular phone which can be connected to the network can be limited to a cellular phone having a function for preventing an illegal invasion from the outside.

According to the invention, even in the case where the homenetwork is a wireless network, in order to prevent the third person from looking surreptitiously, the authentication at the data link level can be performed. The security can be improved by the terminal authentication. Further, there is an advantage such that the setting operation of the router or the like for such a purpose becomes unnecessary and it is sufficient to execute the loading and removing operations of the recording medium.

Further, according to the invention, the secure network can be constructed without implementing the firewall. There is, consequently, an advantage such that a problem in which the homenetwork depends on the implemented firewall and the homenetwork does not become an open network does not occur.

The invention claimed is:

1. A network system, comprising:
a router;
a first and second terminal apparatuses connected to the router; and
a server coupled to and separate from the router and having a database in which a correspondence relation comprising at least an identifier of the router and an identifier of the first terminal apparatus has been registered, wherein:
when the second terminal apparatus requests to communicate with the first terminal apparatus, the first terminal apparatus transmits, via the router, to the server an inquiry regarding whether the second terminal apparatus and the first terminal apparatus belong to the same group associated with the router, wherein the router transmits the identifier of the router to the server with the inquiry;
the server determines whether the second terminal apparatus and the first terminal apparatus belong to the same group by checking whether an identifier of the second terminal apparatus is included in the correspondence relation, and
the server allows communication between the first and second terminal apparatuses when the identifier of the second terminal apparatus is included in the correspondence relation, and denies communication between the first and second terminal apparatuses when the identifier of the second terminal apparatus is not included in the correspondence relation.

2. The network system according to claim 1, wherein the second terminal apparatus connects to the internet through the router even when the server denies communication between the first and second terminal apparatuses.

3. The network system according to claim 1, wherein the identifier of the first or second terminal apparatus has been recorded on a recording medium which is removable to/from the first or second terminal apparatus.

4. The network system according to claim 3, wherein the first or second terminal apparatus is registered with the router when the router obtains the identifier of the first or second terminal apparatus from the recording medium.

5. A terminal apparatus which is connected to a network system through a router, the terminal apparatus being associated with the router, wherein a correspondence relation comprising at least an identifier of the router and an identifier of the terminal apparatus has been registered in a database of a server, the server being coupled to and separate from the router, wherein:

when there is a communicating request from a second terminal apparatus to communicate with the terminal apparatus, the terminal apparatus transmits to the server via the router an inquiry regarding whether the second terminal apparatus and the terminal apparatus belong to the same group associated with the router, wherein the router transmits the identifier of the router with the inquiry; and the terminal apparatus establishes a secure communication with the second terminal apparatus when an identifier of the second terminal apparatus is included in the correspondence relation.

6. A communicating method in a network system in which a server and a router are connected and separated from each other, a first and second terminal apparatuses are connected to the router, and the server has a database in which a correspondence relation comprising an identifier of the router and an identifier of the first terminal apparatus has been registered, the method comprising:

receiving a request for the second terminal apparatus to communicate with the first terminal apparatus;

transmitting, from the first terminal apparatus, an inquiry regarding whether the second terminal apparatus and the first terminal apparatus belong to the same group associated with the router;

transmitting the inquiry with an identifier of the router to the server;

determining, by the server, whether the second terminal apparatus and the first terminal apparatus belong to the same group associated with the router by determining whether an identifier of the second terminal apparatus is included in the correspondence relation;

allowing the first and second terminal apparatuses to communicate when the identifier of the second terminal apparatus is included in the correspondence relation; and prohibiting the first and second terminal apparatuses from communicating with each other when the identifier of the second terminal apparatus is not included in the correspondence relation.

7. The communicating method according to claim 6, wherein the second terminal apparatus connects to the internet through the router even when the server prohibits communication between the first and second terminal apparatuses.

8. The communicating method according to claim 6, wherein the identifier of the first or second terminal apparatus has been recorded on a recording medium which is removable to/from the first or second terminal apparatus.

9. The communicating method according to claim 8, further comprising:

registering the first or second terminal apparatus with the router when the router obtains the identifier of the first or second terminal apparatus from the recording medium.

10. A non-transitory computer-readable recording medium comprising instructions which, when executed by a processor, perform a method in a network system including a server, a router connected to and separate from the server, a first and second terminal apparatuses connected to the router, and a database in the server in which a correspondence relation comprising an identifier of the router and an identifier of the first terminal apparatus has been registered, the method comprising:

receiving a request for the second terminal apparatus to communicate with the first terminal apparatus;

transmitting, from the first terminal apparatus, an inquiry regarding whether the second terminal apparatus and the first terminal apparatus belong to the same group associated with the router;

transmitting the inquiry with an identifier of the router to the server;

determining, by the server, whether an identifier of the second terminal apparatus is included in the correspondence relation;

allowing the communication between the first and second terminal apparatuses when the identifier of the second terminal apparatus is included in the correspondence relation; and prohibiting the first and second terminal apparatuses from communicating with each other when the identifier of the second terminal apparatus is not included in the correspondence relation.

* * * * *